Figures 4, 4A:
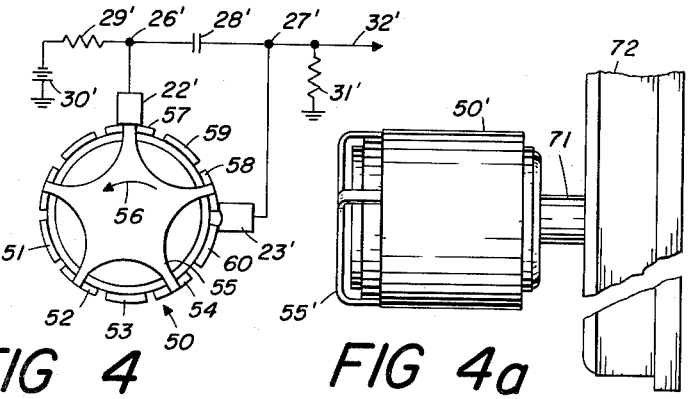

Oct. 5, 1965  D. R. STEVENS  3,210,658
SHAFT ROTATIONAL VELOCITY AND DIRECTION INDICATING MEANS
UTILIZING A PULSE PRODUCING AND BLOCKING COMMUTATOR
Filed Nov. 7, 1961  3 Sheets-Sheet 1
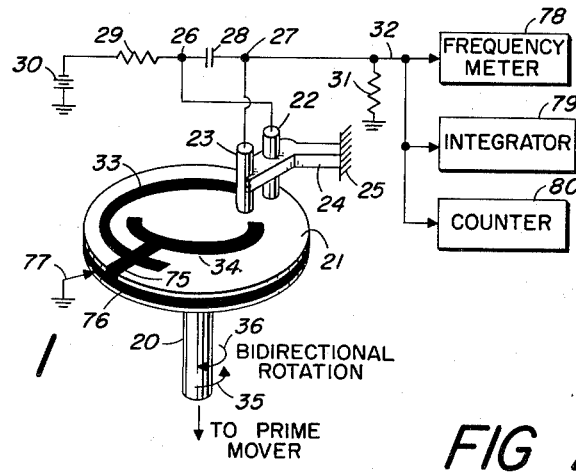
INVENTOR.
DONALD R. STEVENS
BY Moody and Phillion
ATTORNEYS Oct. 5, 1965 D. R. STEVENS 3,210,658
SHAFT ROTATIONAL VELOCITY AND DIRECTION INDICATING MEANS
UTILIZING A PULSE PRODUCING AND BLOCKING COMMUTATOR
Filed Nov. 7, 1961 3 Sheets-Sheet 2

INVENTOR.
DONALD R. STEVENS
BY Moody and Phillips
ATTORNEYS

INVENTOR.
DONALD R. STEVENS
BY Moody and Phillips
ATTORNEYS

United States Patent Office 3,210,658
Patented Oct. 5, 1965

3,210,658
SHAFT ROTATIONAL VELOCITY AND DIRECTION INDICATING MEANS UTILIZING A PULSE PRODUCING AND BLOCKING COMMUTATOR
Donald R. Stevens, Cedar Rapids, Iowa, assignor to Collins Radio Company, Cedar Rapids, Iowa, a corporation of Iowa
Filed Nov. 7, 1961, Ser. No. 150,779
8 Claims. (Cl. 324—70)

This invention relates generally to means for indicating the direction of rotation of a shaft and, more particularly, it relates to a simple and reliable electronic means for determining the amount, the direction, and the angular velocity of rotation of a shaft.

In many mechanical and electrical structures it is desirable to determine either the direction of rotation of a shaft, the angular velocity of rotation of a shaft, or the amount of angular rotation, or all of the foregoing characteristics. For example, in computer work it is frequently desirable to be able to ascertain the direction and the amount of angular rotation of a shaft in converting from analogue quantities to digital quantities, the direction and amount of angular rotation of a shaft being indicative of same particular quantity. Another instance where the direction and amount of angular rotation of a shaft is important is in the tuning of certain electrical circuits. For example, in radio communication gear it is frequently necessary to tune the antenna to the frequency of the particular signal to be transmitted. Other circuit elements which coact with the tuned circuit often must be adjusted in accordance with the specific tuning of the antenna cicuits. If the antenna circuits are tuned by means of a rotating shaft, as they often are, the direction and amount of rotation can be advantageously employed in adjusting the aforementioned other circuit elements.

There are in the prior art many ways of detecting the amount, direction, and velocity of rotation of a shaft. Some of these methods are mechanical in nature, others are electrical in nature. Many of the electrical methods, however, only indicate a direction and do not indicate the angular velocity or the amount of rotation of the rotating shaft. It would mark a definite improvement in the art to provide a structure which would indicate the direction, the angular velocity of a rotating shaft, and the amount of angular rotation.

It is a primary object of the present invention to provide a means which indicates the direction, the angular velocity, and the amount of rotation of a shaft.

A further object of the invention is a simple, inexpensive, and reliable means for indicating the direction of rotation of a rotating shaft.

A third aim of the invention is a simple, inexpensive and reliable means for electrically indicating direction, angular velocity, and amount of rotation of a rotating shaft.

A fourth purpose of the invention is the improvement of means for indicating direction and angular velocity of a rotating shaft, generally.

In accordance with the invention there is provided, on the rotatable shaft or disc whose direction, amount, and angular velocity of rotation is to be determined, grounded commutator means spanning a portion of the circumference of said shaft, or an arcuate portion of the face of a disc, and a pair of brushes arranged to contact said commutator means during different segments of a cycle of angular rotation of said shaft. The commutating means is located on the disc or shaft and the said brushes are positioned about the face of a disc or the periphery of a shaft to cause the time period of contact of said first brush with said commutator means to begin before and to terminate during, the interval of contact of said second brush with said commutator means. The two brushes are connected together by a capacitor with the first brush also being connected to a battery source through the capacitor to the output terminal as negative or nected to ground potential through a load resistor. Thus, as the first brush makes and breaks with the commutator means, a square wave signal with negative and positive edges is produced on said first brush. Such negative and positive edges will, in the absence of other factors, pass through the capacitor to the output terminal as negative or positive pulses. However, depending upon the direction of rotation of the shaft, the second brush will be making contact with the commutator means either during the making or during the breaking of the first brush with said commutator means; thus shorting out either all of the positive pulses or all of the negative pulses that would otherwise appear on the second brush side of the capacitor. The resultant signal appearing at said second plate of the capacitor (i.e., across said load resistor) is a series of pulses whose polarity and repetition rate represents direction and angular velocity, respectively. The number of such pulses represents the amount of rotation.

In accordance with one form of the invention wherein a disc is employed the two brushes may be placed side by side in the face of a disc and in a common plane extending through the axis of the disc. In such an arrangement a separate commutator path will be provided for each brush with the two commutator paths being staggered. Alternatively, the two brushes may be staggered with respect to each other around an arcuate portion of the disc. With such a staggered arrangement of the brushes only one commutator path is required. The important relationship is the staggering of the time intervals during which one of the brushes engages a commutator section with respect to the time intervals that the other brush engages a commutator section.

In another form of the invention wherein a shaft is employed, the brushes may be placed side by side on the periphery of the shaft and in a common plane passing through the axis of the shaft. Under such circumstances two commutator paths are required, one for each brush, with the commutator sections for each of the two brushes being staggered with respect to each other. Alternatively, the brushes may be positioned serially with respect to the angular motion of the shaft, in which case only one commutator path is required, since the time staggered relationship is obtained by staggering the position of the brushes.

Figure 6:
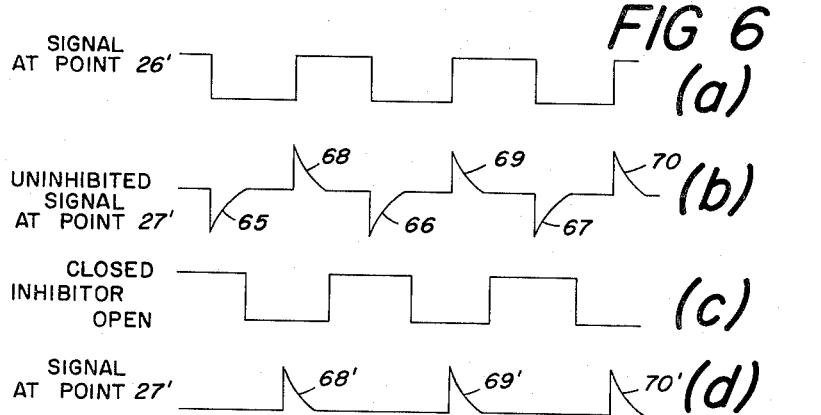
Figure 7:
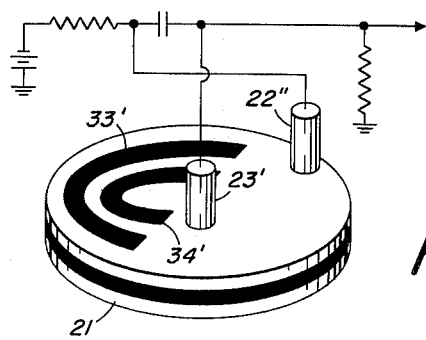
Figure 8:
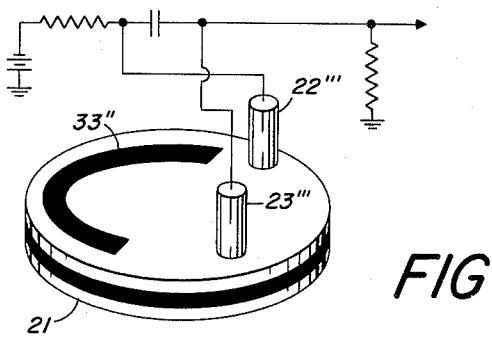
Figure 9:
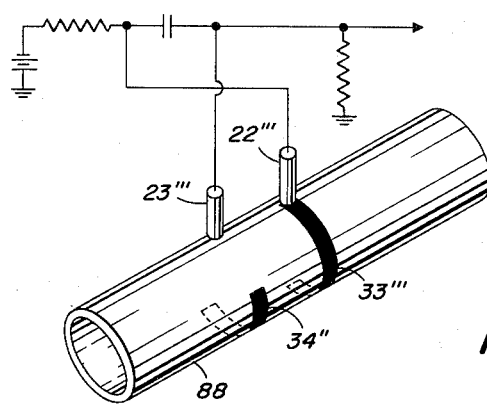

The above-mentioned and other objects and features of the invention will be more fully understood from the following detailed description thereof when read in conjunction with the drawings in which FIG. 1 is a combination of a schematic diagram and perspective sketch of a simplified form of the invention;

FIGS. 2(a) through 2(d) are voltage waveforms showing the signal appearing at various points in the circuit of FIG. 1 through several cycles of operation in a first angular direction of the disc;

FIGS. 3(a) through 3(d) are waveforms similar to those of FIG. 2(a) through 2(d) for operation of the structure of FIG. 1 when the shaft is rotating in the opposite direction;

FIGS. 4 and 4(a) are combination plan views and schematic sketches of a more sophisticated form of the invention;

FIGS. 5(a) through 5(d) are sketches and waveforms to facilitate an understanding of the operation of the structure of FIG. 4 when the shaft is rotating in a first direction;

FIGS. 6(a) through 6(d) are illustrations and curves to facilitate an understanding of the invention of FIG. 4 when the shaft is rotating in the opposite direction; and FIGS. 7, 8, and 9 show alternative forms of the invention.

Referring now to FIG. 1, there is shown a rotatable shaft 20 which is rotatable in both directions. It is desired to provide an electrical signal which is indicative of the direction, the velocity, and the amount of the rotation of shaft 20. To accomplish this result there is provided a disc 21 upon which there is plated, or otherwise suitably formed, two commutator paths 33 and 34 which, respectively, pass under the brushes 22 and 23 as the shaft 20 is rotated. The two commutator paths 33 and 34 are grounded by means of conductive strips 75 and 76 and brush contact 77. The brushes 23 and 22, in this particular embodiment of the invention, lie in the same radial plane with respect to shaft 20 and are mounted in a convenient bracket means 24 which is fixed to suitable support means 25 stationary with respect to the axis of the shaft 20.

The brushes 23 and 22 are connected together through capacitor 28. The brush 22 is also connected to a minus battery source 30 through resistor 29. The brush 23 is connected to load resistor 31, across which there is connected, in parallel manner, a frequency meter 78 for measuring velocity of rotation, an integrating circuit 79 for measuring direction of rotation, and a counter 80 for measuring amount of rotation.

To discuss the operation of the structure, reference is made to FIGS. 2(a) through 2(d). Assume that the rotating shaft 20 is rotating in the direction of the arrow 35. The specific time position of the brushes 22 and 23 in FIG. 1, with respect to the commutators 33 and 34, is represented by the time $t_0$ in FIGS. 2(a) through 2(d). Specifically, it will be observed in FIG. 2(a), which represents the potential of brush 22, that at time $t_0$ the potential of brush 22 is equal to the potential of negative battery source 30. At this same time $t_0$ the potential of the brush 23 is floating since the said brush 23 is riding on an insulated portion of the disc 21. At time $t_1$ the shaft has been rotated counterclockwise to the point where the brush 23 makes contact with the commutator bar 34. FIG. 2(c) is a curve illustrating when the brush 23 is grounded on a commutator bar (the higher level of the curve) and when the brush 23 is riding on the insulative portion of the disc (the lower level of the curve). During the time interval $t_1$–$t_3$ the brush 23 is riding on a grounded commutator bar and will function to short to ground or inhibit the passage of any pulses to the output terminal 32 of FIG. 1. The foregoing inhibiting action can be seen more clearly at time $t_2$ when the brush 22 makes contact with the commutator bar 33 to produce a positive-going edge 38, as shown in FIG. 2(a). This positive-going edge 38 appears at the junction 26 in the structure of FIG. 1 and, in the absence of the inhibiting action mentioned above, would produce a positive pulse on the output terminal 32 through the capacitor 28, such positive pulse being represented by the pulse 39 of FIG. 2(b). However, because the brush 23 is at this time grounded by commutator bar 34, the positive pulse is shorted to ground and does not appear at the point 27.

At the time $t_3$ the shaft 20 is rotated to the point where the brush 23 breaks contact with commutator bar 34, thus removing the inhibitor action. Consequently, at time $t_4$ when the brush 22 breaks contact with the commutator bar 33 to produce a negative-going edge 40, as shown in FIG. 2(a), there will be produced at the output terminal 32 in FIG. 1 a negative-going pulse 41, as shown in FIG. 2(b). Since the brush 23 is not grounded at this time the pulse 41 will actually exist at the output terminal 32. In a similar manner, pulses 42 and 43 of FIG. 2(b) are shorted to ground and pulse 44 appears at the output terminal 32 of FIG. 1. The resultant waveform appearing on output terminal 32 is shown in FIG. 2(d). The negative pulses appearing at the output terminal 32 are integrated by integrator 79 to indicate a counterclockwise direction of rotation of shaft 20. The repetition rate of the negative pulses of FIG. 2(d) is measured by frequency meter 78 and represents the angular velocity of the shaft 20. Counter 80 counts the number of negative pulses to measure the amount of rotation in the counterclockwise direction, as measured from some start time. Another counter means (not specifically shown) can be employed to count the clockwise rotation of the shaft. Alternatively, counter 80 can be constructed to count in the reverse direction in response to positive pulse (as opposed to negative pulses).

Referring now to FIGS. 3(a) to 3(d), there are shown waveforms of the voltages appearing at different points of the circuit of FIG. 1 when the shaft 20 is rotated in a clockwise direction, as indicated by the arrow 36. FIG. 3(a) represents the waveform appearing at the point 26 as the brush 22 passes onto and over the commutator bar 33. FIG. 3(b) represents the signal that would appear at the output terminal 32 in the absence of any inhibiting action. The curve of FIG. 3(c) shows the inhibiting action of ground potential supplied to the brush 23 as it passes over the grounded commutator bar 34. The upper level of the waveform of FIG. 3 represents the closed position of the inhibitor and the lower level of 40 represents the open position of the inhibitor, the open position meaning that no inhibition occurs.

The time $t_0$ in FIGS. 3(a) to 3(d) represents the time position of the brushes 22 and 23 with respect to commutator bars 34 and 33, as shown in FIG. 1. It will be observed that the potential of brush 22 is equal to the potential of battery 30, and that the potential of brush 23 and also the output terminal 32 is floating, which means that the inhibiting action thereof is nonexistent. At the time $t_1$, therefore, when the brush 22 makes contact with the commutating bar 33 and causes the point 26 to go to ground potential, there will be produced at output terminal, by the action of capacitor 28, a positive pulse 81, see FIG. 3(b). At time $t_2$ brush 23 makes contact with the commutator bar 34, thus initiating the inhibitor action mentioned hereinbefore. Consequently, when the brush 22 leaves the commutator bar 33 at time $t_3$, the negative pulse 46 of FIG. 3(b) which, in the absence of inhibiting action would appear on output terminal 32, is inhibited by being shorted to ground through the brush 23. In a similar manner the positive pulses 47 and 48 appear at the output terminal 32, and the negative pulse 49 is inhibited by being shorted to ground through the brush 23. Thus, the output signal appearing at output terminal 32 is shown in FIG. 3(d) and consists entirely of positive pulses, such as pulses 81', 47', and 48'. The polarity of these pulses indicates a clockwise rotation of the shaft 20, the repetition rate of such pulses indicates the angular velocity of the shaft 20, and the number of such pulses represents the amount of angular rotation.

In FIG. 4 there is shown another embodiment of the invention. The schematic diagram portion thereof, including the brushes 22' and 23', correspond to the elements or components in FIG. 1 having the same reference characters, although unprimed. Thus, battery 30', resistors 39' and 31', and capacitor 28' correspond respectively to battery 30, resistors 29 and 31, and capacitor 28 of FIG. 1.

Figure 5:
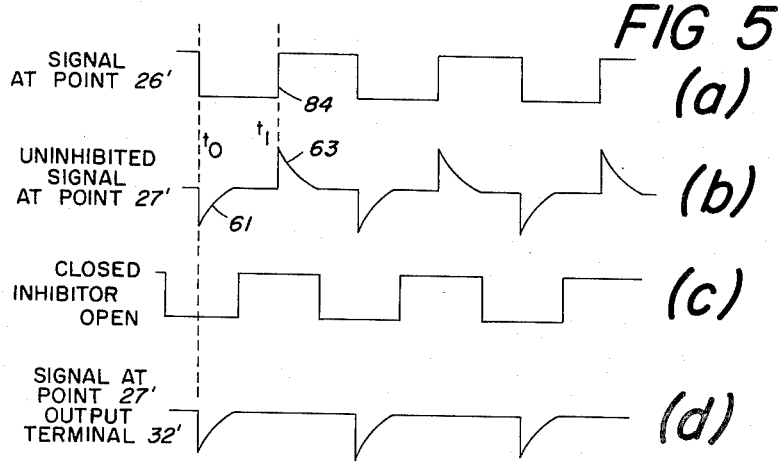

The structure 50 represents an end view of a commutator having a plurality of commutator bars, such as bars 52, 54, and 58 around the periphery thereof. There are 10 bars in all. Alternate ones of these bars, such as bars 52 and 54, are connected together by a common conductive element 55, which is grounded by suitable means (not shown). The remaining bars, such as bars 51 and 53, are not grounded but are floating; that is to say, they are not permanently connected to any reference potential. It will be noted that the brushes 22' and 23' are positioned with respect to the commutator bars in such a manner that the making and the breaking of one of the brushes with a given commutator bar occurs *before* the making and the breaking of the other brush with a non-grounded commutator bar when the commutator is rotating in one direction. Conversely, when the commutator is rotating in the opposite direction, the first-mentioned brush makes and breaks with a given bar *after* the said other brush makes and breaks contact with a non-grounded commutator bar. For purposes of illustration, assume a specific situation. Assume that the commutator 50 is rotating in a counterclockwise direction, as shown by the arrow 56. The brush 22' is shown in FIG. 4 as making contact with a grounded commutator bar 57, whereas the brush 23' is shown as making contact with a grounded bar 58. Thus, the effect of the brush 23' is inhibitive in nature since it will short out any pulse appearing at the point 27'. However, as the commutator 50 rotates counterclockwise the bar 57 will pass out from under the brush 22' and the ungrounded bar 59 will pass under the brush 22', thus causing the potential of the point 26' to change from ground potential to that of minus battery source 30. This potential transition is shown at time $t_0$ in FIG. 5(a), at which time the ungrounded bus 60 is passing under the inhibitor brush 23'. However, since the bar 60 is ungrounded there will be no inhibiting action and the negative-going edge of the waveform of FIG. 5(a) will produce a negative pulse 61' of FIG. 5(d) at output terminal 32'. It is to be understood that the waveform of FIG. 5(b) shows both the negative and positive pulses that would appear at the output terminal 32' in the absence of inhibitor action, whereas the waveform of FIG. 6(d) shows only those pulses which do appear at the output terminal 32'.

As the commutator 55 continues to rotate in a counterclockwise direction, the commutator bar 58 will pass under the brush 22' to produce a positive-going transition at point 26', as shown by the waveform edge 84. However, at this time the brush 23' is making contact with the grounded bar 54 so as to inhibit. Consequently, the positive pulse 63 of FIG. 5(b), which in the absence of inhibition would occur, is inhibited and does not appear at the output terminal 32' of FIG. 4.

The operation with a clockwise direction of rotation will now be discussed with the waveform of FIGS. 6(a) through 6(d). With a clockwise direction of rotation inhibition occurs during each of the negative pulses 65, 66, and 67 which would be generated in the absence of inhibition, so that only the positive pulses 68, 69, and 70 appear at the output terminal 32'. Such output signal is shown in FIG. 6(d).

Referring to FIG. 4(a), there is shown a sideview of the commutator 50' and a shaft 71 which connects commutator to a suitable prime mover 72. It can be seen that the grounding plate 55' fits over the end of the commutator 50 to ground alternate commutator bars.

Referring now to FIGS. 7, 8, and 9, there are shown various modifications of the invention. Specifically, in FIG. 7 there is shown a modification of the embodiment of FIG. 1. In FIG. 7 the position of the two brushes 22" and 23' are staggered 90° apart rather than staggering the positions of the commutator paths 33' and 34' 90° apart as was done in FIG. 1. Further, the brushes 22" and 23' are positioned different radial distances from the axis of the disc 21 so that the brush 22" will ride over the commutator path 33' and the brush 23' will ride over the commutator path 34'. The relationship between the time intervals when the brushes 22" and 23" make with the commutator bars 33' and 34' 90° is the same, however, as in the case of the structure of FIG. 1.

In FIG. 8 there is shown a modification of FIG. 7. In FIG. 8 the two brushes 22''' and 23''' are radially spaced from the axis of disc 21 an equal distance so that each brush will ride on the single commutator bar 33". The relationship between the time intervals when the brushes 22''' and 23''' make contact with the single commutator bar 33" is the same as the time relationship discussed in connection with the structure of FIG. 1.

In FIG. 9 there is shown another modification of the invention wherein two commutator paths 33''' and 34" are employed around the periphery of the shaft 88. Two brushes 22''' and 23''' are arranged to pass over individual ones of the commutator paths, which are staggered with respect to each other by a half commutator section. Since the commutator section covers a 180° portion of the shaft, the amount of staggering between the two commutator sections is 90°. If each commutator path consists of two sections, the amount of staggering would be 45°.

It is to be noted that the forms of the invention shown and described herein are but preferred embodiments thereof and that various changes may be made in circuit arrangement and in the physical construction of the brushes and the commutator bars without departing from the spirit or the scope of the invention.

I claim:

1. Rotatable shaft rotation measuring means comprising commutating bar means fixed to said rotatable shaft, at least a pair of brushes positioned adjacent said rotatable shaft, means for connecting said commutating bar means to a first reference potential, means for connecting a first of said brushes to a second reference potential, impedance load means having a first terminal connected to the second of said brushes and a second terminal connected to said first reference potential, capacitor means connected between said first and second brushes, said first and second brushes being angularly positioned with respect to said commutator bar means to cause, in continuous time sequence, the contacting of one only of said brushes with said commutator bar means, the contacting of both of said brushes with said commutating bar means, and the contacting of the other only of said brushes with said commutator bar means, said second brush responsive to contact with said commutator bar means to supply said first reference potential to said first terminal of said impedance load means to block any pulses generated at said first brush from appearing across said impedance load means, and means constructed to detect the number and polarity of pulses appearing across said impedance load means, the number and polarity of said pulses being representative of the amount and the direction of angular rotation of said rotatable shaft.

2. Rotatable shaft rotation measuring means in accordance with claim 1 comprising disc means mounted upon said rotatable shaft and in a plane substantially normal to the axis of said rotatable shaft, and in which said commutator bar means comprises conductive path means positioned on the face of said disc substantially concentric with respect to the axis of said rotatable shaft.

3. Rotatable shaft rotation measuring means in accordance with claim 2 in which said commutator bar means is comprised of two distinct arcuate paths at different radial distances from the axis of said rotatable shaft and angularly staggered, and in which said brushes are individually positioned so that the two commutator paths will make contact with individual ones of said brushes on a time-staggered relationship as the rotatable shaft is rotated.

4. Rotatable shaft rotation measuring means in accordance with claim 2 in which said commutator bar means comprises an arcuate path concentric with said rotatable shaft and in which said brushes are both positioned in the path of said commutator bar means but at different angular positions with respect to said rotatable shaft to cause the commutator bar to contact the two brushes in a time-staggered relationship.

5. Rotatable shaft rotation measuring means in accordance with claim 1 in which said commutator bar means is formed circumferentially around said rotatable shaft and in a plane parallel to a plane normal to the axis of the rotatable shaft.

6. Rotatable shaft rotation measuring means in accordance with claim 5 in which said commutator bar means comprises two separate paths positioned in a staggered manner with respect to each other around said rotatable shaft, and in which said two brushes are each positioned adjacent a commutator path to cause said commutator paths to individually make contact with said brushes in a time-staggered relationship as said rotatable shaft is rotated.

7. Rotatable shaft rotation measuring means in accordance with claim 5 in which said commutator bar means comprising a single conductive path, and in which said two brushes are positioned to lie in the path of said commutator bar means and to make contact therewith when said rotatable shaft is rotated, said brushes being positioned at different angular positions around the circumference of said rotatable shaft.

8. Rotatable shaft rotation measuring means in accordance with claim 7 in which said commutator bar means is comprised of arcuate sections serially positioned concentrically around said rotatable shaft and connected together electrically, each of said sections being separated from the adjacent section by an electrical gap, said brushes being positioned adjacent said commutator bar means to produce a time-staggered contact period between the commutator bar means and said two brushes.

References Cited by the Examiner

UNITED STATES PATENTS 2,462,655    2/49    McHenry _____ 340—271

FOREIGN PATENTS 202,207    6/56    Australia.
548,661    10/42    Great Britain.

WALTER L. CARLSON, *Primary Examiner.*